(12) United States Patent
Hori et al.

(10) Patent No.: US 10,014,542 B2
(45) Date of Patent: Jul. 3, 2018

(54) CELL, CELL STACK DEVICE, MODULE, AND MODULE STORAGE DEVICE

(71) Applicant: KYOCERA Corporation, Kyoto-shi, Kyoto (JP)

(72) Inventors: Yuuichi Hori, Kirishima (JP); Akihiro Hara, Kirishima (JP)

(73) Assignee: KYOCERA Corporation, Kyoto-shi, Kyoto (JP)

(*) Notice: Subject to any disclaimer, the term of this patent is extended or adjusted under 35 U.S.C. 154(b) by 0 days.

(21) Appl. No.: 15/327,662

(22) PCT Filed: Oct. 28, 2015

(86) PCT No.: PCT/JP2015/080421
§ 371 (c)(1),
(2) Date: Jan. 20, 2017

(87) PCT Pub. No.: WO2016/068200
PCT Pub. Date: May 6, 2016

(65) Prior Publication Data
US 2017/0207473 A1    Jul. 20, 2017

(30) Foreign Application Priority Data
Oct. 29, 2014 (JP) ................. 2014-220394

(51) Int. Cl.
*H01M 8/1226* (2016.01)
*H01M 8/241* (2016.01)
(Continued)

(52) U.S. Cl.
CPC ..... *H01M 8/1226* (2013.01); *H01M 8/04201* (2013.01); *H01M 8/241* (2013.01); *H01M 8/2465* (2013.01); *H01M 2008/1293* (2013.01)

(58) Field of Classification Search
CPC .......... H01M 8/1226; H01M 8/04201; H01M 8/241; H01M 8/2465
See application file for complete search history.

(56) References Cited

U.S. PATENT DOCUMENTS

| 2006/0014057 A1 | 1/2006 | Ellwood et al. |
| 2010/0062317 A1 | 3/2010 | Selcuk |
| 2012/0148940 A1 | 6/2012 | Kuehn et al. |

FOREIGN PATENT DOCUMENTS

| JP | 2013030359 A | 2/2013 |
| JP | 2014110087 A | 6/2014 |
| WO | 2008048445 A2 | 4/2008 |

OTHER PUBLICATIONS

The extended European Search Report based on Application No. 15854632.5 dated Feb. 28, 2018, 7 pages (Reference Purpose Only).

(Continued)

*Primary Examiner* — Oi K Conley
(74) *Attorney, Agent, or Firm* — Viering, Jentschura & Partner mbB (57) ABSTRACT

A cell of the present disclosure includes a support body having a pillar shape, containing nickel, and including a gas-flow passage passing through an interior of the support body in a longitudinal direction, a first end portion including an outlet of the gas-flow passage, and a second end portion including an inlet of the gas-flow passage, a first electrode layer located upon the support body, a solid electrolyte layer located upon the first electrode layer, and a second electrode layer located upon the solid electrolyte layer. The support body has a lower metallic nickel content at the first end portion than at a central portion in the longitudinal direction. As such, the cell is capable of suppressing damage.

8 Claims, 4 Drawing Sheets

(51) Int. Cl.
*H01M 8/2465* (2016.01)
*H01M 8/04082* (2016.01)
*H01M 8/124* (2016.01)

(56) References Cited

OTHER PUBLICATIONS

International Search Report (Form PCT/ISA/210) dated Feb. 2, 2016 and issued for PCT/JP2015/080421.

CELL, CELL STACK DEVICE, MODULE, AND MODULE STORAGE DEVICE

RELATED APPLICATIONS

The present application is a national stage entry according to 35 U.S.C. § 371 of PCT application No.: PCT/JP2015/080421 filed on Oct. 28, 2015, which claims priority from Japanese application No.: 2014-220394 filed on Oct. 29, 2014 and is incorporated herein by reference in its entirety.

TECHNICAL FIELD

The present invention relates to a cell, a cell stack device, a module and a module-containing device.

BACKGROUND ART

In recent years, various fuel cell devices have been proposed as next-generation energy sources. A fuel cell device includes a cell stack device configured by electrically connecting, in series, a plurality of solid oxide fuel cells (also referred to simply as "fuel cells" hereinafter) serving as cells and a housing container that houses the cell stack device.

In such a fuel cell device, each fuel cell includes a support body. The support body contains nickel and extends in a longitudinal direction (Patent Document 1). The support body includes gas-flow passages passing therethrough in the longitudinal direction and has a configuration in which a fuel gas flows in those gas-flow passages.

CITATION LIST

Patent Literature

Patent Document 1: Japanese Unexamined Patent Application Publication No. 2013-30359A

SUMMARY OF INVENTION

Technical Problem

Here, when the operation of the fuel cell device is stopped, there are cases where an oxygen-containing gas supplied to the fuel cell flows in through outlets of the gas-flow passages in the support body when the supply of the fuel gas to the fuel cell is stopped. However, in the above-described Patent Document 1, the amount of metallic nickel present in the support body is uniform along the longitudinal direction. As such, when an oxygen-containing gas flows into the support body from a first end portion of the support body in which the outlets of the gas-flow passages are provided, the metallic nickel in the first end portion of the support body may oxidize, resulting in a sudden volume expansion and causing damage.

An object of the present invention is to provide a cell, a cell stack device, a module, and a module-containing device capable of suppressing damage.

Solution to Problem

A cell according to the present invention includes a support body, a first electrode layer, a solid electrolyte layer, and a second electrode layer. The support body has a pillar shape, contains nickel, and includes a gas-flow passage, a first end portion, and a second end portion. The gas-flow passage passes through an interior of the support body in a longitudinal direction. The first end portion includes an outlet of the gas-flow passage. The second end portion includes an inlet of the gas-flow passage. The first electrode layer is located upon the support body. The solid electrolyte layer is located upon the first electrode layer. The second electrode layer is located upon the solid electrolyte layer. The support body has a lower metallic nickel content at the first end portion than at a central portion in the longitudinal direction.

A cell stack device according to the present invention includes a plurality of the cells described above arranged and electrically connected to each other.

A module according to the present invention includes a housing container and the above-described cell stack device housed in the housing container.

A module-containing device according to the present invention includes an external casing, the above-described module housed in the external casing, and an auxiliary device housed in the external casing and configured to operate the module.

Advantageous Effects of Invention

In the support body, the metallic nickel content is less at the first end portion in the longitudinal direction than at the central portion in the longitudinal direction. It is thus possible to provide a cell, as well as a cell stack device, a module, and a module-containing device including such a cell, that can suppress damage caused by volume expansion even in the case where an oxygen-containing gas has flowed into the support body from the outlet of the gas-flow passage.

BRIEF DESCRIPTION OF DRAWINGS

FIGS. 1A and 1B illustrate an example of an embodiment of a cell. FIG. 1A is a horizontal cross-sectional view, and FIG. 1B is a side view.

FIGS. 4A and 4B illustrate examples of a cell stack device using the cell illustrated in FIGS. 1A and 1B. FIG. 4A is a side view schematically illustrating the cell stack device.

DESCRIPTION OF EMBODIMENT

Cell

Figure 1A:
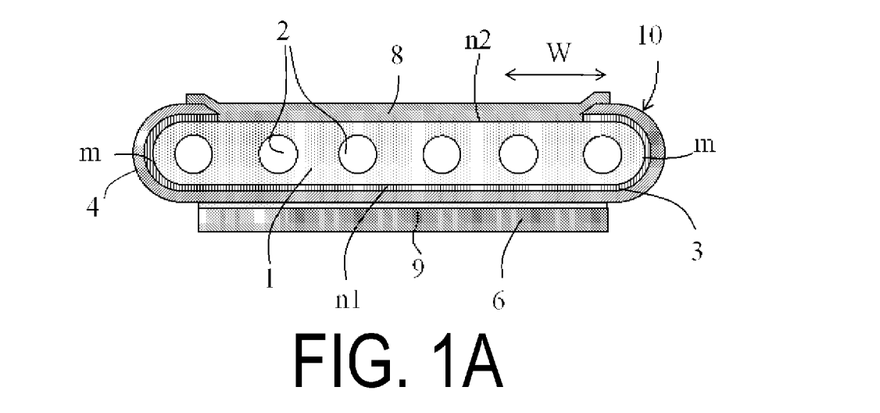
Figure 1B:
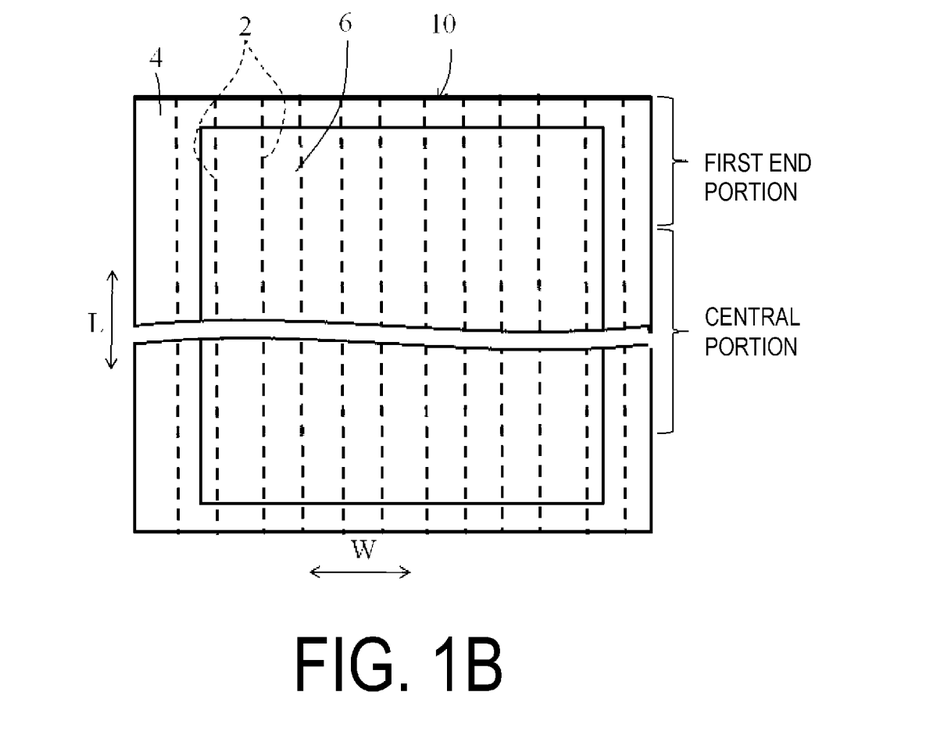

FIGS. 1A and 1B illustrate an example of an embodiment of a cell. FIG. 1A is a horizontal cross-sectional view, and FIG. 1B is a side view. Here, both diagrams illustrate parts of the configurations of a fuel cell 10 in an enlarged manner. Other drawings also illustrate parts in an enlarged manner. Note that in the following descriptions, the cell 10 will be referred to both as a "solid oxide fuel cell" and simply as a "cell".

In the example illustrated in FIGS. 1A and 1B, the cell 10 includes a support body 1. The support body 1 has a pillar shape. Additionally, in the example illustrated in FIGS. 1A and 1B, the support body 1 has a flat plate shape. Furthermore, the support body 1 has a hollow flat plate shape, and a long, narrow plate shape. In the interior of the support body 1, a plurality of gas-flow passages 2 are defined at appropriate intervals and pass through the support body 1 in a longitudinal direction L thereof. The cell 10 has a structure in which various members are provided on the support body 1.

As illustrated in FIG. 1B, the support body 1 has the longitudinal direction L. The support body 1 has a plate shape constituted of a pair of main surfaces (a first main surface n1 and a second main surface n2) which face each other and arced surfaces (side surfaces) m which connect the pair of main surfaces n1 and n2, as can be understood from the shapes illustrated in FIGS. 1A and 1B. Furthermore, as in the example illustrated in FIGS. 1A and 1B, the plate-shaped support body 1 also has a lateral direction w.

Here, a fuel electrode layer 3, which is a first electrode layer, is disposed covering the first main surface n1 (a main surface on one side) and the arced surfaces m on both sides thereof. A solid electrolyte layer 4 formed from a ceramic having a gas blocking property is furthermore disposed covering the fuel electrode layer 3. From the point of view of improving the power generation capability, the thickness of the solid electrolyte layer 4 is desirably 40 μm or less, more desirably 20 μm or less, and further more desirably 15 μm or less.

In addition, an oxygen electrode layer 6, which is a second electrode layer, is disposed on the surface of the solid electrolyte layer 4 on the first main surface n1 and faces the fuel electrode layer 3 with an intermediate layer 9 located therebetween. That is, the intermediate layer 9 is provided between the oxygen electrode layer 6 and the solid electrolyte layer 4.

A dense interconnector layer 8 formed from lanthanum chromite-based ($LaCrO_3$ based) oxide having a gas blocking property is disposed on the second main surface n2 (a main surface on another side; an upper surface) on which the solid electrolyte layer 4 is not laminated, with a cohesion layer (not illustrated) located therebetween.

That is, the fuel electrode layer 3 and the solid electrolyte layer 4 are disposed from the first main surface n1, around the arced surfaces m at both ends, and up to the second main surface n2. Both end portions of the interconnector layer 8 are laminated and bonded to corresponding both end portions of the solid electrolyte layer 4.

In other words, the support body 1 is surrounded by the solid electrolyte layer 4 and the interconnector layer 8, and is configured such that a fuel gas flowing through the interior thereof does not leak to the exterior. In other words, the solid electrolyte layer 4 and the interconnector layer 8 form a tubular body having a gas blocking property. The interior of the tubular body serves as a fuel gas flow passage. The fuel gas supplied to the fuel electrode layer 3 and an oxygen-containing gas supplied to the oxygen electrode layer 6 are blocked by the tubular body.

To be more specific, as illustrated in FIG. 1B, the oxygen electrode layer 6, which has a rectangular planar shape, is disposed except for the upper and lower end portions of the support body 1, while the interconnector layer 8 is, although not illustrated here, disposed from the upper end of the support body 1 in the longitudinal direction L thereof to the lower end thereof. Both end portions of the support body 1 in the lateral direction W thereof are bonded to the surfaces of corresponding both end portions of the solid electrolyte layer 4.

In the cell 10, a part where the fuel electrode layer 3 and the oxygen electrode layer 6 face each other with the solid electrolyte layer 4 located therebetween functions as a fuel cell and generates power. That is, oxygen-containing gas such as air flows to the outer side of the oxygen electrode layer 6 and the fuel gas (hydrogen-containing gas) flows in the gas-flow passages 2 within support body 1, and the gases are heated to a predetermined actuation temperature, generating power as a result. Then, current generated by this power generation is collected via the interconnector layer 8 disposed on the support body 1.

Each member constituting the fuel cell 3 illustrated in FIGS. 1A and 1B will be described next.

A generally-known material can be used for the fuel electrode layer 3 serving as the first electrode layer. For example, the fuel electrode layer 3 can be formed from $ZrO_2$ (referred to as a stabilized zirconia; also includes partially stabilized zirconia) forming a solid solution with a porous electrically-conductive ceramic such as a rare earth element and at least one of Ni and NiO.

The solid electrolyte layer 4 is required to function as an electrolyte that allows ions to move between the electrodes and also have a gas blocking property that prevents the fuel gas and the oxygen-containing gas from leaking. The solid electrolyte layer 4 is formed from $ZrO_2$ forming a solid solution with from 3 to 15 mol % of a rare earth element. Note that the solid electrolyte layer 4 may be formed from another material as long as that material exhibits the above-described properties.

The material for the oxygen electrode layer 6 serving as the second electrode layer is not particularly limited, and any generally-known material may be used. For example, the oxygen electrode layer 6 may be formed of an electrically-conductive ceramic made from a so-called $ABO_3$ perovskite oxide. The oxygen electrode layer 6 is required to be gas permeable, and the open porosity of the oxygen electrode layer 6 is preferably no less than 20% and particularly preferably in the range of from 30 to 50%.

The interconnector layer 8 can be formed from electrically-conductive ceramics, but because the interconnector layer 8 makes contact with the fuel gas (hydrogen-containing gas) and oxygen-containing gas (air or the like), the interconnector layer 8 is required to be reduction resistant and oxidation resistant. As such, a lanthanum chromite perovskite oxide ($LaCrO_3$ oxide) is suitable for use as the interconnector layer 8. The interconnector layer 8 is required to be dense in order to prevent leaks of the fuel gas flowing through the plurality of gas-flow passages 2 defined in the support body 1 and leaks of the oxygen-containing gas flowing on the outer side of the support body 1. As such, the interconnector layer 8 preferably has a relative density of no less than 93% and particularly no less than 95%.

The support body 1 is required be gas permeable to allow the fuel gas to permeate through to the fuel electrode layer 3 and is required to also be electrically conductive in order to allow current collection through the interconnector layer 8. Therefore, it is necessary to employ a material that satisfies these requirements, and as such, a material such as an electrically conductive ceramic or cermet can be used for the support body 1. For production of the cell 10, if the support body 1 is produced by simultaneous firing with the fuel electrode layer 3 or the solid electrolyte layer 4, the support body 1 is preferably formed from nickel and a specific rare earth oxide ($Y_2O_3$, $Yb_2O_3$, or the like).

"Nickel" referred to here includes both unoxidized metallic nickel (Ni) and nickel oxide (NiO, $Ni_2O_3$, and the like).

Incidentally, in the present embodiment, from the points of view of maintaining favorable electrical conductivity in the support body 1 and bringing the thermal expansion coefficient close to that of the solid electrolyte layer 4, the nickel (including metallic nickel and nickel oxide) and the rare earth oxide are preferably present at a volume ratio of from 35:65 to 65:35. Here, other metal components or oxide components may be contained in the support body 1 in a range in which the required characteristics are not impaired.

Additionally, to ensure a desired gas permeability, the support body 1 preferably has an open porosity of no less than 30%, and particularly in the range from 35 to 50%. The support body 1 also preferably has an electrical conductivity of no less than 300 S/cm and particularly no less than 440 S/cm.

The intermediate layer 9 is disposed between the solid electrolyte layer 4 and the oxygen electrode layer 6 in order to strengthen the bond between the solid electrolyte layer 4 and the oxygen electrode layer 6 and suppress the formation of a reactive layer having a high electric resistance due to a reaction between the components of the solid electrolyte layer 4 and the components of the oxygen electrode layer 6.

The intermediate layer 9 can be formed as a composition that contains Cerium (Ce) and another rare earth element. The intermediate layer 9 preferably has a composition expressed by, for example, $$(CeO_2)_{1-x}(REO_{1.5})_x, \quad (1):$$

where RE represents at least one of Sm, Y, Yb, and Gd, and x represents a number satisfying $0<x\leq0.3$.

Furthermore, in order to reduce the electric resistance, Sm or Gd is preferably used as RE. For example, the intermediate layer 9 is preferably formed from a $CeO_2$ forming a solid solution with from 10 to 20 mol % of $SmO_{1.5}$ or $GdO_{1.5}$.

Additionally, the intermediate layer 9 can be formed as two layers in order to strongly bond the solid electrolyte layer 4 to the oxygen electrode layer 6 and further suppress the formation of a reaction layer having a high electric resistance due to a reaction between components of the solid electrolyte layer 4 and components of the oxygen electrode layer 6.

Additionally, although not illustrated, a cohesion layer for reducing, for example, a difference in thermal expansion coefficients between the interconnector layer 8 and the support body 1 may also be disposed between the interconnector layer 8 and the support body 1.

A composition similar to that of the fuel electrode layer 3 can be used as the cohesion layer. For example, the cohesion layer can be formed of $ZrO_2$ (called stabilized zirconia) forming a solid solution with a rare earth element such as YSZ and at least one of Ni and NiO. Note that the $ZrO_2$ forming a solid solution with the rare earth element and the at least one of Ni and NiO are preferably set to a volume ratio in a range of from 40:60 to 60:40.

As illustrated in FIGS. 1A and 1B, the support body 1 includes a first end portion in which outlets of the gas-flow passages 2 are provided, and a second end portion in which inlets of the gas-flow passages 2 are provided. Additionally, the first end portion of the support body 1 in the longitudinal direction thereof has a lower metallic nickel content than a central portion in the longitudinal direction.

Here, "central portion" refers to a part in the center of the support body 1 when the support body 1 is divided into five parts in the longitudinal direction. "First end portion", meanwhile, refers to a part on one end side of the support body 1 divided into five parts.

When the operation of the fuel cell device is stopped, the oxygen-containing gas supplied to the fuel cell 10 may flow into the support body 1 through the outlets in the gas-flow passages 2 when the supply of the fuel gas to the fuel cell 10 is stopped. When the oxygen-containing gas flows into the support body 1, the metallic nickel in the support body 1 oxidizes and becomes nickel oxide, which causes a volume expansion. As opposed to this, in the cell 10 according to the present embodiment, the metallic nickel content at the first end portion in the longitudinal direction is less than the metallic nickel content at the central portion in the longitudinal direction. Thus, even if the metallic nickel oxidizes and expands, the amount of expansion at the first end portion of the support body 1 can be suppressed, which makes it possible to suppress damage caused by the volume expansion.

The metallic nickel content being less in the first end portion in the longitudinal direction than in the central portion refers to a case where the ratio of metallic nickel at the first end portion is less than at the central portion when the support body 1 is analyzed through X-ray diffraction. Here, the ratio of metallic nickel is found as (peak value of metallic nickel obtained through X-ray diffraction)/(sum of peak value of metallic nickel obtained through X-ray diffraction and peak value of nickel oxide)×100(%). Note that the sum of a peak value of NiO and a peak value of $Ni_2O_3$ is used as the peak value of the nickel oxide.

In the case where the metallic nickel content at the central portion of the support body 1 is 1, for example, the metallic nickel content at the first end portion of the support body 1 is preferably in a range from 0.4 to 0.95. At no greater than 0.95, the first end portion has a low metallic nickel content, which makes it possible to effectively suppress the amount of expansion at the first end portion. Meanwhile, at no less than 0.4, the metallic nickel content at the first end portion is not too low, which makes it possible to suppress a drop in the electrical conductivity of the support body 1 at the first end portion.

Additionally, the metallic nickel content may decrease gradually as the support body 1 progresses from the central portion toward the first end portion in the longitudinal direction, or may decrease suddenly at a boundary in a given location.

Additionally, the first end portion of the support body 1 in the longitudinal direction thereof preferably has a lower porosity than the central portion in the longitudinal direction.

As described above, when the operation of the fuel cell device is stopped, the oxygen-containing gas supplied to the fuel cell 10 may flow into the support body 1 through the outlets of the gas-flow passages 2. However, because the porosity of the support body 1 is less at the first end portion in the longitudinal direction than at the central portion, the amount of oxygen-containing gas flowing into the support body at the first end portion can be suppressed.

Thus because the inflow of oxygen-containing gas at the first end portion having a low amount of metallic nickel can be suppressed, damage caused by volume expansion can furthermore be suppressed.

For example, in the case where the porosity of the support body 1 at the central portion thereof in the longitudinal direction is 1, the porosity of the support body 1 at the first end portion thereof in the longitudinal direction is preferably in a range from 0.8 to 0.95.

Additionally, the porosity may decrease gradually as the support body 1 progresses from the central portion toward the first end portion in the longitudinal direction, or may decrease suddenly at a boundary in a given location.

Figure 2:
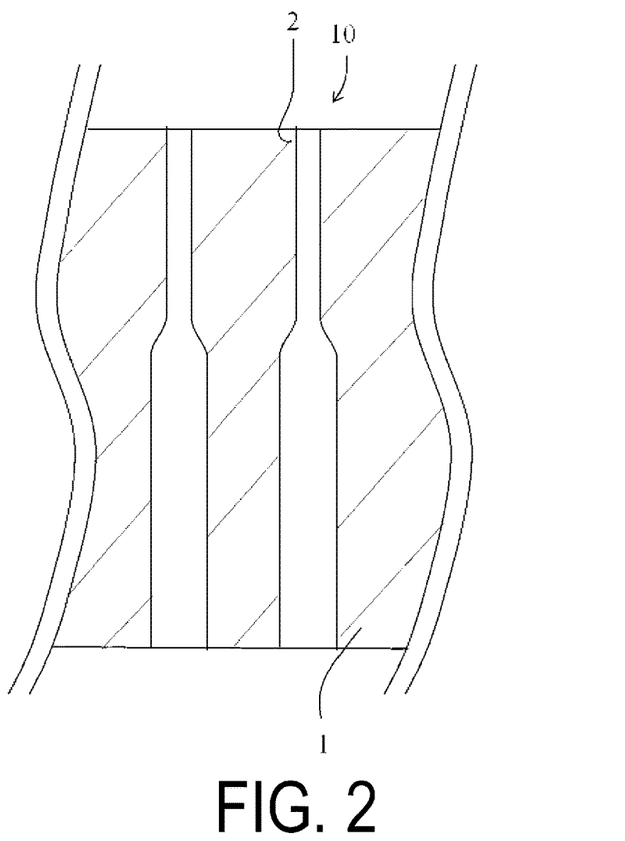
FIG. 2 illustrates another example of an embodiment of a cell, and illustrates part of a vertical cross-sectional view of the cell.

FIG. 2 illustrates another example of an embodiment of a cell, and illustrates part of a vertical cross-sectional view of the cell. As indicated by the example illustrated in FIG. 2, the gas-flow passages 2 preferably have a smaller diameter at a first end portion than at a central portion.

When the operation of the fuel cell device is stopped, the oxygen-containing gas supplied to the fuel cell 10 may flow into the support body 1 through the outlets in the gas-flow passages 2. However, because the gas-flow passages 2 have smaller diameters at the first end portions thereof than at the central portions thereof, a situation where the oxygen-containing gas flows back into the gas-flow passages 2 can be suppressed. Thus because the inflow of oxygen-containing gas at the first end portion having a low amount of metallic nickel can be suppressed, damage caused by volume expansion can furthermore be suppressed.

In the case where, for example, the diameters at the first end portions of the support body 1 in the longitudinal direction are 1, the diameters at the central portions of the support body 1 in the longitudinal direction are preferably in a range from 1.003 to 1.03.

Additionally, the diameters of the gas-flow passages 2 may decrease gradually as the passages progress from the central portion toward the second end portion of the support body 1 in the longitudinal direction thereof, or may decrease suddenly at a boundary in a given location.

Meanwhile, the metallic nickel content near the surfaces of the support body 1 is preferably less than the metallic nickel content at the interior of the support body 1. According to this configuration, even if the oxygen-containing gas flows into the support body 1 through the outlets of the gas-flow passages 2, the metallic nickel content is comparatively low near the surfaces of the support body 1, and thus volume expansion can be suppressed at the surfaces of the support body 1. This makes it possible to suppress damage such as peeling between the surfaces of the support body 1 and the fuel electrode layer 3, the solid electrolyte layer 4, or the like disposed on the surfaces of the support body 1.

In the case where the metallic nickel content at the interior of the support body 1 is 1, for example, the metallic nickel content near the surfaces of the support body 1 is preferably in a range from 0.85 to 0.98.

In particular, at the first end portion of the support body 1 in the longitudinal direction thereof, the metallic nickel content near the surfaces of the support body 1 is preferably less than the metallic nickel content at the interior of the support body 1. More of the oxygen-containing gas flows in at the first end portion of the support body 1 in the longitudinal direction, where the outlets of the gas-flow passages 2 are provided. Thus at the first end portion, it is particularly easy for peeling to arise between the support body 1 and the fuel electrode layer 3, the solid electrolyte layer 4, and the like disposed on the surfaces of the support body 1. As such, providing a comparatively lower metallic nickel content near the surfaces of the support body 1 at the first end portion of the support body 1 in the longitudinal direction thereof makes it possible to effectively suppress damage such as peeling of the solid electrolyte layer 4.

Additionally, on the second main surface n2 side of the support body 1, the metallic nickel content is preferably less at the end sides in the lateral direction W than at a central portion in the lateral direction W. Here, "central portion" refers to a part in the center of the support body 1 when the support body 1 is divided into five parts in the lateral direction. "First end portion", meanwhile, refers to a part on one end side of the support body 1 divided into five parts. In the example illustrated in FIGS. 1A and 1B, both end portions of the solid electrolyte layer 4 are disposed at respective end portion sides of the second main surface n2 of the support body 1. Thus in the case where the metallic nickel content is comparatively low at the end portion sides of the second main surface n2 of the support body 1, volume expansion at those end portion sides can be suppressed. This makes it possible to suppress a situation in which the end portions of the solid electrolyte layer 4 peel.

Figure 3:
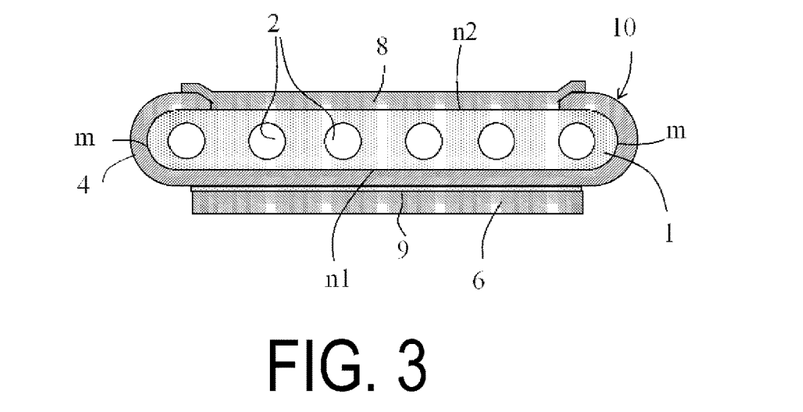
FIG. 3 is a horizontal cross-sectional view of another embodiment, illustrating a fuel cell in which a fuel electrode layer serves as a support body.

FIG. 3 is a horizontal cross-sectional view of another embodiment, illustrating a fuel cell in which a fuel electrode layer serves as a support body. The same actions and effects as the embodiment illustrated in FIGS. 1A and 1B can be achieved in this case as well. That is, in the embodiment illustrated in FIGS. 1A and 1B, the fuel electrode layer 3, the solid electrolyte layer 4, and the oxygen electrode layer 6 are laminated on the support body 1. However, as in the embodiment illustrated in FIG. 3, the fuel electrode layer itself may be used as the support body 1 and the solid electrolyte layer 4 and the oxygen electrode layer 6 may be disposed on this support body 1.

Although a plurality of the gas-flow passages 2 are defined in the support body 2 in the example illustrated in FIG. 3, only a single gas-flow passage 2 may be defined.

Measurement Method

A method for measuring the metallic nickel content at the first end portion of the support body 1 in the longitudinal direction thereof and the metallic nickel content at the central portion in the longitudinal direction thereof will be described next. First, five gas-flow passages 2 are selected at random. The support body 1 is then ground down until inner walls of the gas-flow passages 2 are exposed. Next, for each of the five gas-flow passages 2, a midpoint that is on the inner wall of the gas-flow passage 2 and that is located midway thereon in the longitudinal direction is determined. The ratio of metallic nickel at each of the five midpoints is calculated, and an average value thereof is then calculated. The average value of the ratio of metallic nickel at each of the five midpoints is calculated in the same manner at the central portions in the longitudinal direction as well. These average values are taken as the metallic nickel content at the first end portion in the longitudinal direction and the metallic nickel content at the central portion in the longitudinal direction, respectively.

A method for measuring the diameters of the gas-flow passages 2 at the first end portion of the support body 1 in the longitudinal direction thereof and the diameters of the gas-flow passages 2 at the central portion in the longitudinal direction thereof will be described next. First, as described above, the support body 1 is ground down such that the inner walls of the gas-flow passages 2 are exposed as illustrated in FIG. 2. Next, midpoints on the inner walls of the gas-flow passages 2 on the first end portion are determined in the same manner as described above. Next, the diameters of the gas-flow passages 2 at the midpoints are found using vernier calipers or the like. This is carried out for five gas-flow passages 2 selected at random, and an average value is then calculated. The same method may then be applied to the central portions. These average values may then be taken as the diameters of the gas-flow passages 2 at the first end portion in the longitudinal direction and the diameters of the gas-flow passages 2 at the central portion in the longitudinal direction, respectively.

A method for measuring the porosity at the first end portion of the support body 1 in the longitudinal direction thereof and the porosity at the central portion in the longitudinal direction thereof will be described next. First, the first end portion and the central portion of the support body 1 are cut out. The support body 1 is then polished and ground down until the members aside from the support body 1, such as the oxygen electrode layer 6 and the interconnector layer 8, are no longer present. The porosities of the pieces corresponding to the first end portion and the central portion may then be found using the Archimedes method.

A method for measuring the metallic nickel content near the surfaces of the support body 1 and the metallic nickel content at the interior of the support body 1 will be described next. First, an end surface of the support body 1 on the first end portion side thereof is observed. Next, a first point adjacent to the gas-flow passages 2 is set on the end surface. A line extending in a thickness direction of the support body 1 is then drawn on the end surface. This line is made to pass through the first point. Next, a second point that is on the stated line and adjacent to the first main surface n1 of the support body 1 is set. The ratio of metallic nickel is then calculated at the first point and the second point. According to the descriptions given thus far, the operations for calculating the ratio of metallic nickel at the first point and the second point are carried out for a single gas-flow passage 2 selected at random. However, the same operations are carried out for four other random gas-flow passages 2 as well. Next, the average value of the ratio of metallic nickel at the five first points is found and taken as the metallic nickel content at the interior. Likewise, the average value of the ratio of metallic nickel at the five second points is found and taken as the metallic nickel content near the surfaces.

A method for measuring the metallic nickel content at the first end portion in the lateral direction, on the second main surface n2 side of the support body 1, and the metallic nickel content at the central portion in the lateral direction, on the second main surface n2 side of the support body 1, will be described next. First, an end surface of the support body 1 on the first end portion side thereof is observed. Next, a point adjacent to the gas-flow passages 2 at the first end portion is set on the end surface. The ratio of metallic nickel at this point is found and taken as the metallic nickel content at the first end portion. Next, a point adjacent to the gas-flow passages 2 at the central portion is set on the end surface. The ratio of metallic nickel at this point is found and taken as the metallic nickel content at the central portion.

Manufacturing Method

An example of a method for manufacturing the cell 10 described above will be described next.

First, for example, a green body is prepared by mixing at least one of Ni and NiO powder, powder of inorganic oxides such as $Y_2O_3$, an organic binder, and a solvent. The organic binder is mixed at an amount adjusted so that the green body exhibits fluidity. From the standpoint of applicability for injection molding, which will be described later, a thermoplastic resin is preferably used as the organic binder. A support body powder compact is then made through injection molding using this green body, and the compact is dried. Here, a calcined body in which the support body powder compact is calcined for 2 to 6 hours at from 900 to 1,000° C. may be used as the support body powder compact.

Additionally, a resin powder compact having a predetermined shape is fixed, using tools such as pins, within a metal mold used for the injection molding. A resin that vaporizes and burns off at a temperature attained when the support body powder compact is calcined or fired is used as the material for the resin powder compact. The shape of the resin powder compact is set to the desired shape of the gas-flow passages 2. For example, when the gas-flow passages 2 is defined such that the diameters thereof are less at the first end portion than at the central portion as illustrated in FIG. 2, a resin powder compact having the same shape as the gas-flow passages 2 may be prepared.

The support body powder compact having the resin powder compact in its interior is obtained by carrying out injection molding by injecting the above-described green body into the metal mold in which the resin powder compact is provided. Thereafter, the support body powder compact is calcined or fired, raising the support body powder compact to a predetermined temperature and burning off the resin powder compact. As such, the region in the support body that was occupied by the resin powder compact becomes an empty space. As a result, the support body 1 having the gas-flow passages 2 in which the diameters are less at the first end portion than at the central portion can be obtained.

Next, for example, the raw materials of NiO and $ZrO_2$ (YSZ) forming a solid solution with $Y_2O_3$ are weighed and mixed in accordance with a predetermined compounding composition. After this, a fuel electrode layer slurry is prepared by mixing an organic binder and a solvent in the mixed powder.

Then, a slurry formed by adding toluene, a binder powder, a commercially-available dispersing agent, and the like to $ZrO_2$ powder forming a solid solution with rare earth elements is molded using a doctor blade method or the like to manufacture a sheet-shaped solid electrolyte layer powder compact.

A fuel electrode layer powder compact is formed by applying the slurry for the fuel electrode layer to the obtained sheet-shaped solid electrolyte layer powder compact, and a sheet-shaped laminated powder compact is formed as a result. The fuel electrode layer powder compact-side surface of the sheet-shaped laminated powder compact on which the fuel electrode layer powder compact and the solid electrolyte layer powder compact are laminated is laminated on the support body powder compact, and a powder compact is formed as a result.

Next, the laminated powder compact described above is calcined for 2 to 6 hours at from 800 to 1,200° C. Next, a slurry is manufactured by mixing an inter-connector layer material (for example, $LaCrMgO_3$-based oxide powder), an organic binder, and a solvent. The subsequent steps for the method for manufacturing the fuel cell having a cohesion layer will be described.

Next, a cohesion layer powder compact located between the supporting body 1 and the interconnector layer 8 is formed. For example, $ZrO_2$ forming a solid solution with Y is mixed with NiO in a volume ratio in a range of 40:60 to 60:40, and the resultant is dried. A cohesion layer slurry is then prepared by adding an organic binder and the like, and the slurry is applied to the support body powder compact between both end portions of the solid electrolyte layer powder compact to form the cohesion layer powder compact.

Next, the intermediate layer 9 disposed between the solid electrolyte layer 4 and the oxygen electrode layer 6 is formed. For example, raw material powder for an intermediate layer powder compact is prepared by carrying out a thermal treatment for 2 to 6 hours at from 800 to 900° C. on $CeO_2$ powder forming a solid solution with $GdO_{1.5}$. An intermediate layer slurry is produced by adding toluene as a solvent to this raw material powder, and an intermediate layer powder compact is produced by applying this slurry to the solid electrolyte layer powder compact.

After this, an interconnector layer slurry is applied to the cohesion layer powder compact upper surface such that both end portions of the interconnector layer powder compact are laminated on both end portions of the solid electrolyte layer powder compact (calcined body), and a laminated powder compact is produced. Here, it is also possible to prepare an interconnector layer slurry, produce an interconnector layer sheet, laminate the interconnector layer sheet on the cohesion layer powder compact upper surface such that both end portions of the interconnector layer sheet are laminated to both end portions of the solid electrolyte powder compact, and produce a laminated powder compact.

Next, the laminated powder compact described above is subjected to a binder removal treatment, and co-sintering (co-firing) is carried out in an oxygen-containing atmosphere for 2 to 6 hours at from 1400 to 1500° C., and particularly at from 1425 to 1475° C.

Then, by applying a slurry containing an oxygen electrode layer material (for example, an $LaCoO_3$-based oxide powder), a solvent, and a pore-forming agent to an intermediate layer through dipping or the like, and baking the layer for 2 to 6 hours at from 1000 to 1300° C., the cell 10 having the structure illustrated in FIGS. 1A and 1B can be manufactured.

Then, hydrogen gas is allowed to flow into the gas-flow passages 2 of the cell 10 from the inlets on the second end portion thereof, and the support body 1 is subjected to a reduction treatment. At this time, the reduction treatment is preferably carried out under conditions of, for example, from 750 to 1000° C. for from 5 to 20 hours. During this reduction treatment, the support body 1 has the gas-flow passages 2 in which the diameters are less at the first end portion than at the central portion, and thus the reduction progresses more quickly at the central portion of the support body 1 and more slowly at the first end portion of the support body 1. Accordingly, the first end portion of the support body 1 in the longitudinal direction thereof has a lower metallic nickel content than the central portion in the longitudinal direction thereof.

Note that by using this manufacturing method, a cell in which the diameters of the outlets of the gas-flow passages 2 at the first end portion of the support body 1 are less than the diameters of the gas-flow passages 2 at the central portion can also be manufactured.

In the descriptions given thus far, the configuration in which the metallic nickel content is made less at the first end portion of the support body 1 is realized through a method in which the diameters of the inlets of the gas-flow passages 2 at the first end portion of the support body 1 are made less than at the central portion. However, as another method, a method in which the porosity at the first end portion of the support body 1 is made less than at the central portion may be employed.

In this case too, it becomes difficult for hydrogen gas to diffuse at the first end portion of the support body 1 than at the central portion, which makes it difficult for the reduction to progress. This makes it possible to achieve a lower metallic nickel content than at the central portion.

Furthermore, extrusion molding can be used as a method for making the porosity at the first end portion of the support body 1 less than at the central portion. For example, when making the green body by mixing at least one of Ni and NiO powder, a powder of an inorganic oxide such as $Y_2O_3$, an organic binder, and a solvent, resin beads may also be added. A resin that vaporizes and burns off at a temperature attained when the support body powder compact is calcined or fired is used as the material for the resin beads. The resin beads are made from a large amount of granular objects.

A green body into which a large amount of these resin beads is mixed is arranged so as to be located at a leading end of a container of an extrusion molding device, and a green body into which a small amount of the resin beads is mixed is arranged within the container so as to be located behind the green body described above.

Then, the support body powder compact in which many resin beads are present at the first end portion and few resin beads are present at the central portion is created through extrusion molding, and that powder compact is then dried. Here, a calcined body in which the support body powder compact is calcined for 2 to 6 hours at from 900 to 1000° C. may be used as the support body powder compact. The resin beads burn off during the calcination treatment, a later process of co-firing, and the like. The support body 1 in which the porosity is less at the first end portion than at the central portion can be formed as a result.

To reduce the metallic nickel content at a specific site, such as in a case where the metallic nickel content near the surfaces of the support body 1 is made less than the metallic nickel content at the interior of the support body 1, an amount of resin beads mixed into a corresponding site in the support body powder compact may be made less than at other sites in the same manner as the method described above.

The foregoing describes a method in which the gas-flow passages 2 are defined such that the diameters thereof at the first end portion are less than the diameters at the central portion, or a method in which the porosity at the first end portion of the support body 1 is made less than at the central portion, in order to provide a lower metallic nickel content at the first end portion of the support body 1 than at the central portion. However, the embodiment is not limited thereto, and the amount of hydrogen gas flowing in the gas-flow passages 2 during the aforementioned reduction treatment may be set to be comparatively low. Doing so makes it easier for the reduction to progress at the central portion of the support body 1, and more difficult for the reduction to progress as the first end portion.

Cell Stack Device

Figure 4A:
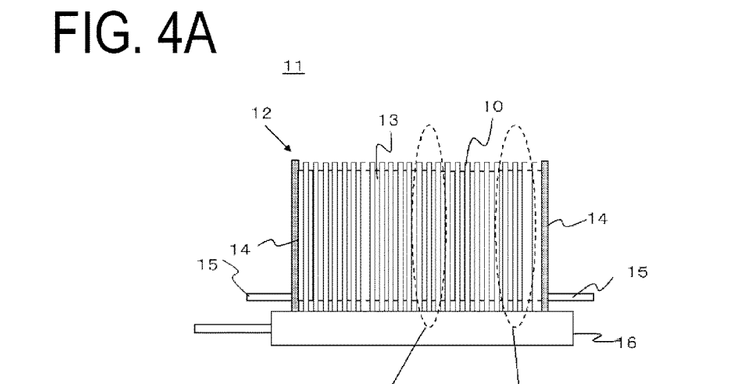
Figure 4B:
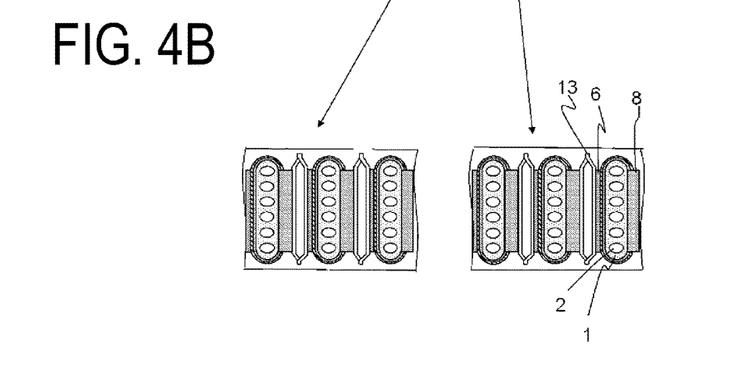
FIG. 4B is a cross-sectional view illustrating parts of the areas surrounded by broken lines in the cell stack device in FIG. 4A in an enlarged manner.

FIGS. 4A and 4B illustrate an example of the cell stack device configured by electrically connecting a plurality of the cells 10 illustrated in FIGS. 1A and 1B in series via current collection members 13. FIG. 4A is a side view schematically illustrating a cell stack device 11, and FIG. 4B is a cross-sectional view illustrating parts of the cell stack device 11 illustrated in FIG. 4A in an enlarged manner, illustrating the areas surrounded by the broken lines illustrated in FIG. 4A. In FIG. 4B, the parts corresponding to the areas surrounded by the broken lines illustrated in FIG. 4A are indicated by arrows for clarity, and in the cell 10 illustrated in FIG. 4B, some of the members such as the intermediate layer described above are not illustrated.

Here, in the cell stack device 11, a cell stack 12 is configured by arranging the cells 10 interposing a current collection member 13 between adjacent cells 10, with the lower end portion (the second end portion) of each fuel cell 10 fixed using an adhesive such as a glass sealing material to a gas tank 16 for allowing the fuel gas to be supplied to the fuel cells 10. In addition, the cell stack 12 is sandwiched from both ends in a direction in which the fuel cells 10 are arranged using elastically deformable electrically conductive members 14. The lower ends of the electrically conductive members 14 are fixed to the gas tank 16.

In addition, the electrically conductive members 14 are provided with current extracting members 15 having a shape extending toward the outer side in the direction in which the fuel cells 10 are arranged, for extracting electrical current generated by the power generation of the cell stack 12 (the fuel cells 10).

In FIG. 4B, two of the cells 10 are electrically connected by one of the current collection members 13. The current collection members 13 are configured by, for example, forming slits extending in the lateral direction at predetermined intervals in the longitudinal direction in a thermally-resistant alloy plate having a rectangular shape and making strip sections between the slits alternately protrude in the thickness direction of the thermally-resistant alloy plate. The cell stack 12 is configured by bonding the strip sections protruding in the opposing direction to corresponding cells 10 using an electrically conductive adhesive.

Module

Figure 5:
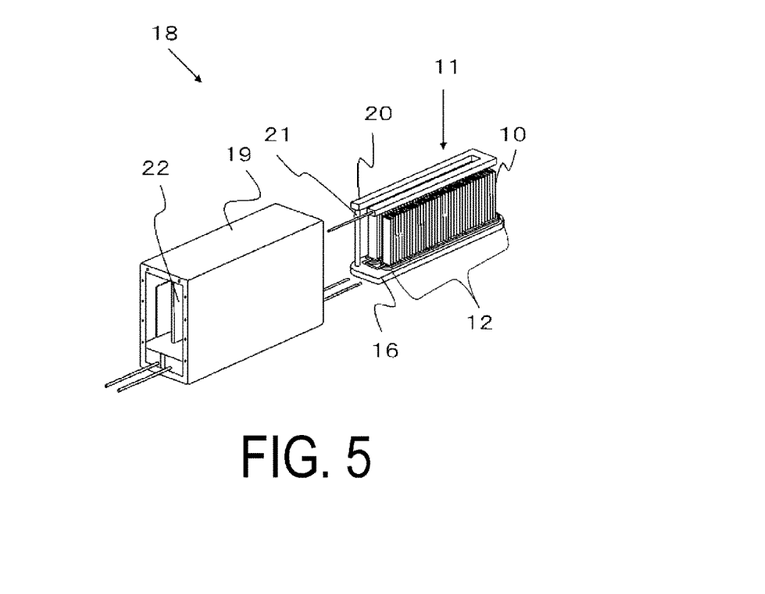
FIG. 5 is an exterior perspective view illustrating an example of a module.

FIG. 5 is an exterior perspective view illustrating an example of a module 18 in which the cell stack device 11 is housed in a housing container 19. The module 18 includes cell stack device 11 illustrated in FIGS. 4A and 4B housed in the rectangular cuboid-shaped housing container 19.

Here, a reformer 20 for generating fuel gas by reforming raw fuel such as natural gas or kerosene is arranged above the cell stack 12 in order to obtain the fuel gas to be used in the fuel cell 10. Then, the fuel gas generated by the reformer 20 is supplied to the gas tank 16 via a gas distribution pipe 21 and supplied to the gas-flow passages 2 provided in the fuel cell 10 via the gas tank 16.

Here, FIG. 5 illustrates a state in which parts (the front and back surfaces) of the housing container 19 are detached and the fuel cell stack device 11 and the reformer 20 housed in the interior have been removed to the rear. In the fuel cell module 18 illustrated in FIG. 5, the cell stack device 11 can be housed in the housing container 19 by being slid thereinto. Here, the cell stack device 11 may include the reformer 20.

In addition, in FIG. 5, an oxygen-containing gas introducing member 22 provided in the housing container 19 is arranged between a pair of cell stacks 12 lined up in the gas tank 16, and oxygen-containing gas is supplied to the lower end portions of the fuel cells 10 such that the flow of the oxygen-containing gas is synchronized with the flow of the fuel gas so as to flow at the sides of the fuel cell 10 from the lower end portions toward the upper end portions. Then, by inducing a reaction between the fuel gas discharged from the gas-flow passages 2 of the fuel cell 10 with the oxygen-containing gas to be burned at the upper end portion side of the fuel cell 10, the temperature of the fuel cell 10 can be increased and the activation of the fuel cell stack device 11 can be accelerated. In addition, the reformer 20 arranged above the fuel cell 10 (the cell stack 12) can be heated by burning the oxygen-containing gas and the fuel gas discharged from the gas-flow passages 2 of the fuel cell 10 on the upper end portion side of the fuel cell 10. This enables the reformer 20 to carry out the reformation reaction efficiently.

Furthermore, because the cell stack device 11 using the fuel cell 10 described above is housed in the housing container 19 in the fuel cell module 18 of the present embodiment, a module 18 with improved reliability can be obtained.

Module-Containing Device

Figure 6:
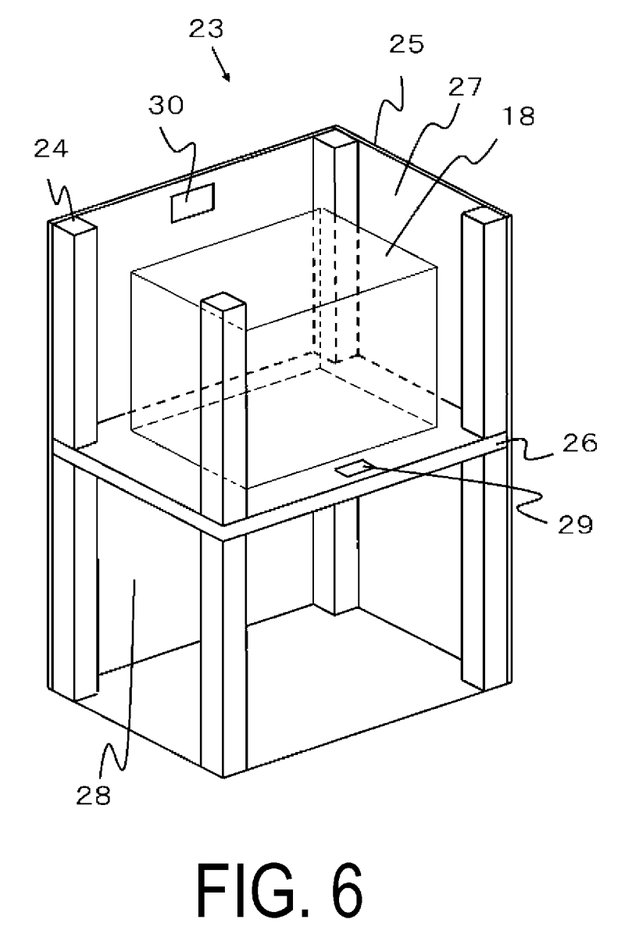
FIG. 6 is a perspective view illustrating a module-containing device with a part thereof not illustrated.

FIG. 6 is a perspective view illustrating an example of a module-containing device in which the module 18 illustrated in FIG. 5 and an auxiliary device configured to operate the cell stack device 11 are housed in an external casing. Note that some of the components of the configuration are not illustrated in FIG. 6.

In a module-containing device 23 illustrated in FIG. 6, an external casing formed of supports 24 and outer plates 25 is divided into upper and lower regions by a dividing plate 26. The upper region forms a module housing chamber 27 for housing the above-described module 18. The lower region forms an auxiliary device housing chamber 28 for housing auxiliary devices configured to operate the module 18. Note that the auxiliary devices housed in the auxiliary device housing chamber 28 are not illustrated.

Furthermore, an airflow hole 29 for allowing air in the auxiliary device housing chamber 28 to flow into the module housing chamber 27 is provided in the dividing plate 26, and an exhaust hole 30 for exhausting air out of the module housing chamber 27 is provided in one of the outer plates 25 of the module housing chamber 27.

In the module-containing device 23, as described above, by configuring the module 18 having improved reliability to be housed in the module housing chamber 27, it is possible to obtain the module-containing device 23 having improved reliability.

Although the foregoing embodiment describes a hollow plate solid oxide fuel cell as an example, the solid oxide fuel cell may of course be a cylindrical type or a flat-plate type. In addition, the fuel cell may be a so-called banded-type fuel cell. Furthermore, various intermediate layers may be formed between each of the members in accordance with the functions. In addition, for example, the fuel cell may be a fuel cell in which the oxygen electrode layer, the solid electrolyte layer, and the fuel electrode layer are disposed on the electrically conductive support body.

EXAMPLES

First, a support body powder compact was manufactured by mixing NiO powder having an average particle diameter of 0.5 μm and $Y_2O_3$ powder having an average particle diameter of 0.9 μm such that a volume ratio after firing and reduction was 48 volume % of the NiO to 52 volume % of the $Y_2O_3$, forming a green body prepared in a solvent with an organic binder through injection molding, and then drying and degreasing the resultant. To define the gas-flow passages 2 in which the diameters thereof are less at the first end portion than at the central portion, a support body powder compact containing a resin powder compact having the same shape as the gas-flow passages was manufactured in the manner described above.

Next, a 30 μm-thick solid electrolyte layer sheet was manufactured through a doctor blade method using a slurry obtained by mixing an organic binder, a solvent, and $ZrO_2$ powder (solid electrolyte layer raw material powder) forming a solid solution with 8 mol % of Y and having a particle diameter of 0.8 μm according to a micro-track method.

As a slurry for forming the intermediate layer powder compact, a composite oxide containing 90 mol % of $CeO_2$ and 10 mol % of a rare earth element oxide ($GdO_{1.5}$, $SmO_{1.5}$), or a composite oxide containing 92 mol % of $CeO_2$ and 8 mol % of $GdO_{1.5}$, was ground in a vibrating mill or a ball mill using isopropyl alcohol (IPA) as a solvent. This was then subjected to a calcination treatment for 4 hours at 900° C., and then to a crushing process again in a ball mill to adjust the degree of aggregation of ceramic particles. An acrylic binder and toluene were then added to the resulting powder, which was mixed to create the slurry.

Next, a slurry for the fuel electrode layer was manufactured, in which NiO powder with an average particle diameter of 0.5 μm, $ZrO_2$ powder forming a solid solution with $Y_2O_3$, an organic binder, and a solvent were mixed. This slurry was then applied to a solid electrolyte layer sheet using a screen printing method and dried to form a fuel electrode layer powder compact. Next, a slurry for forming the intermediate layer powder compact was applied to the solid electrolyte layer sheet on the surface of the side opposite the surface where the fuel electrode layer powder compact was formed, using a screen printing method, and then dried in order to form the intermediate layer powder compact.

A sheet-shaped laminated powder compact in which the intermediate layer powder compact and the fuel electrode layer powder compact were formed on both surfaces of the solid electrolyte layer sheet was laminated at a predetermined position on the support body powder compact with the surface of the fuel electrode layer powder compact side on the inner side.

Next, the laminated powder compact in which the above-described powder compacts were laminated was subjected to calcination treatment for 3 hours at 1000° C. In this calcination treatment, the above-described resin powder compact was burned off, resulting in the support body powder compact having the gas-flow passages 2 in which the diameters at the first end portion are less than at the central portion.

Next, a slurry was produced in which La $(Mg_{0.3}Cr_{0.7})_{0.96}O_3$, an organic binder, and a solvent were mixed.

Raw materials formed of Ni and YSZ were mixed and dried and a cohesion layer slurry was prepared by mixing an organic binder and solvent. The prepared cohesion layer slurry was applied to a site where the fuel electrode layer of the support body (and the solid electrolyte layer) was not formed (a site where the support body is exposed) to laminate the cohesion layer powder compact, and the interconnector layer slurry was applied to the intermediate layer powder compact and the cohesion layer powder compact.

Next, the laminated powder compact described above was subjected to a binder removal treatment, and co-firing was carried out in an oxygen-containing atmosphere for 2 hours at 1450° C.

Next, a mixture solution formed of $La_{0.6}Sr_{0.4}Co_{0.2}Fe_{0.8}O_3$ powder with an average particle diameter of 2 μm and isopropyl alcohol was produced and spray-coated on the surface of the intermediate layer of the laminated sintered compact, to form an air electrode layer powder compact. Then, baking was carried out for 4 hours at 1100° C. to form an air electrode layer. Thus, samples No. 1 to 6 of the fuel cell illustrated in FIGS. 1A and 1B was manufactured.

Note that the dimensions of the manufactured fuel cell were 25 mm×200 mm; the thickness of the support body (the thicknesses between the first main surface n1 and the second main surface n2) was 2 mm, with an open porosity of 35%; the thickness of the fuel electrode layer was 10 μm, with an open porosity of 24%; the thickness of the air electrode layer was 50 μm, with an open porosity of 40%; and the relative density of the solid electrolyte layer was 97%.

Sample No. 7 of the fuel cell, having a support body in which the gas-flow passages 2 were defined so that the diameters thereof at the first end portion were greater than the diameters at the central portion, was also manufactured as a comparative example.

Next, hydrogen gas was supplied into the fuel cell according to the Example (samples No. 1 to 6) and according to the Comparative Example (sample No. 7), and the support body and the fuel electrode layer were subjected to a reduction treatment for 10 hours at 850° C. The ratios of metallic nickel in the support bodies of samples No. 1 to 7 were as indicated in Table 1 as a result of this reduction treatment.

Next, fuel gas was supplied from the inlets to the outlets (the first end portion sides) of the gas-flow passages in the fuel cells according to the Examples (samples No. 1 to 6) and according to the Comparative Example (sample No. 7), and the supply of fuel gas was stopped after a set amount of time. It was then observed whether or not damage due to volume expansion caused by oxidization had occurred at the first end portion of the support body. This observation was carried out using a scanning electron microscope (SEM). The results are shown in Table 1.

In Table 1, x indicates that there was no damage to the first end portion of the support body, whereas ○ indicates that there was damage to the first end portion of the support body.

TABLE 1

| Sample No. | Ratio of metallic nickel at central portion (%) | Ratio of metallic nickel at first end portion (%) | Presence/absence of damage at first end portion |
|---|---|---|---|
| 1 | 47 | 43 | X |
| 2 | 66 | 43 | X |
| 3 | 84 | 81 | X |
| 4 | 82 | 77 | X |
| 5 | 49 | 46 | X |
| 6 | 51 | 45 | X |
| 7 | 85 | 87 | ○ |

Based on the results indicated in Table 1, there was no damage to the first end portion of the support body in the case where the metal Ni ratio at the first end portion was less than the ratio of metallic nickel at the central portion, as in the Examples (samples No. 1 to 6). On the other hand, there was damage to the first end portion of the support body in the case where the ratio of metallic nickel at the first end portion was greater than the ratio of metallic nickel at the central portion, as in the Comparative Example (sample No. 7).

REFERENCE SIGNS LIST

1 Support body
2 Gas-flow passage
3 Fuel electrode layer (first electrode layer)
4 Solid electrolyte layer
6 Oxygen electrode layer (second electrode layer)
8 Interconnector layer
10 Fuel cell
11 Cell stack device
18 Module
23 Module-containing device

The invention claimed is:
1. A cell comprising:
  a support body having a pillar shape, containing nickel, and comprising
  a gas-flow passage passing through an interior of the support body in a longitudinal direction,
  a first end portion comprising an outlet of the gas-flow passage and
  a second end portion comprising an inlet of the gas-flow passage;
  a first electrode layer located upon the support body;
  a solid electrolyte layer located upon the first electrode layer; and a second electrode layer located upon the solid electrolyte layer,
wherein the support body has a lower metallic nickel content at the first end portion than at a central portion in the longitudinal direction.

2. The cell according to claim 1, wherein the support body has a lower porosity at the first end portion than at the central portion in the longitudinal direction.

3. The cell according to claim 1, wherein the gas-flow passage has a smaller diameter at the first end portion than at the central portion.

4. The cell according to claim 1, wherein the metallic nickel content at a surface of the support body is less than the metallic nickel content at the interior of the support body.

5. The cell according to claim 1,
wherein
the support body comprises a pair of main surfaces,
the first electrode layer is disposed on at least first main surface of the pair the main surfaces of the support body,
the solid electrolyte layer is disposed from the first main surface of the support body to a second main surface of the pair of main surfaces and covers the first electrode layer,
the second electrode layer is disposed upon the solid electrolyte layer and faces the first electrode layer,
an end portion of the solid electrolyte layer is located on a side of an end portion of the second main surface in a lateral direction, and
on a side of the second main surface of the support body, the end portion in the lateral direction has a lower metallic nickel content than a central portion in the lateral direction.

6. A cell stack device comprising a plurality of the cell according to claim 1 arranged and electrically connected to each other.

7. A module comprising:
a housing container; and
the cell stack device according to claim 6 housed in the housing container.

8. A module-containing device comprising:
an external casing;
the module according to claim 7, housed in the external casing; and
an auxiliary device housed in the external casing and configured to operate the module.

* * * * *